(12) United States Patent
Satheesh Kumar et al.

(10) Patent No.: US 12,619,925 B2
(45) Date of Patent: May 5, 2026

(54) CONTEXT-LEVEL FEDERATED LEARNING

(71) Applicant: Telefonaktiebolaget LM Ericsson (publ), Stockholm (SE)

(72) Inventors: Perepu Satheesh Kumar, Chennai (IN); Saravanan M, Chennai (IN); Senthamiz Selvi Arumugam, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 913 days.

(21) Appl. No.: 17/792,580

(22) PCT Filed: Jan. 16, 2020

(86) PCT No.: PCT/IN2020/050047
§ 371 (c)(1),
(2) Date: Jul. 13, 2022

(87) PCT Pub. No.: WO2021/144803
PCT Pub. Date: Jul. 22, 2021

(65) Prior Publication Data
US 2023/0065937 A1 Mar. 2, 2023

(51) Int. Cl.
*G06Q 10/047* (2023.01)
*G06N 3/098* (2023.01)
(Continued)

(52) U.S. Cl.
CPC ........... *G06Q 10/047* (2013.01); *G06N 3/098* (2023.01); *G06N 20/00* (2019.01); *G06Q 10/087* (2013.01)

(58) Field of Classification Search
CPC ...................................................... G06N 3/098
See application file for complete search history.

(56) References Cited

U.S. PATENT DOCUMENTS

2017/0116566 A1* 4/2017 Walton ................. G06Q 10/087
2018/0373988 A1* 12/2018 Dhanyamraju ........ G06N 20/20
(Continued)

OTHER PUBLICATIONS

Khurana, Rahul, and Deepak Kaul. "Dynamic cybersecurity strategies for ai-enhanced ecommerce: A federated learning approach to data privacy." Applied Research in Artificial Intelligence and Cloud Computing 2.1 (2019): 32-43. (Year: 2019).*
(Continued)

*Primary Examiner* — Eric Nilsson
(74) *Attorney, Agent, or Firm* — ROTHWELL, FIGG, ERNST & MANBECK, P.C.

(57) ABSTRACT

A method performed by a local client computing device is provided. The method includes training a local model using data from the local client computing device, resulting in a local model update; sending the local model update to a central server computing device; receiving from the central server computing device a first updated global model; determining that the first updated global model does not meet a local criteria, wherein determining that the first updated global model does not meet a local criteria comprises computing a score based on the first updated global model, wherein the score exceeds a threshold; in response to determining that the first updated global model does not meet a local criteria, sending to the central server computing device context information; and receiving from the central server computing device a second updated global model.

20 Claims, 7 Drawing Sheets

(51) Int. Cl.
  *G06N 20/00* (2019.01)
  *G06Q 10/087* (2023.01)

(56) References Cited

U.S. PATENT DOCUMENTS

| | | |
|---|---|---|
| 2019/0012592 A1 | 1/2019 | Beser et al. |
| 2019/0042937 A1 | 2/2019 | Sheller et al. |
| 2019/0340534 A1 | 11/2019 | McMahan et al. |
| 2019/0385043 A1 | 12/2019 | Choudhary et al. |

OTHER PUBLICATIONS

Luo, Tie, and Sai G. Nagarajan. "Distributed anomaly detection using autoencoder neural networks in WSN for IoT." 2018 IEEE international conference on communications (ICC). IEEE, 2018. (Year: 2018).*

Zhang, Jun, and Khaled B. Letaief. "Mobile edge intelligence and computing for the internet of vehicles." Proceedings of the IEEE 108.2 (2019): 246-261. (Year: 2019).*

Wang et al. "CMFL: Mitigating communication overhead for federated learning." 2019 IEEE 39th international conference on distributed computing systems (ICDCS). IEEE, 2019. (Year: 2019).*

International Search Report and Written Opinion issued in International Application No. PCT/IN2020/050047, dated May 14, 2020 (8 pages).

H. Brendan McMahan et al., "Federated Learning of Deep Networks using Model Averaging", arXiv:1602.05629v1 [cs.LG] Feb. 17, 2016 (11 pages).

Jakub Konečný, et al., "Federated Learning: Strategies for Improving Communication Efficiency", arXiv:1610.05492v2 [cs.LG] Oct. 30, 2017 (10 pages).

Yue Zhao, et al., "Federated Learning with Non-IID Data", arXiv:1806.00582v1 [cs.LG] Jun. 2, 2018 (13 pages).

Fel Chen, et al. "Federated Meta-Learning with Fast Convergence and Efficient Communication", arXiv:1802.07876v2 [cs.LG] Dec. 14, 2019 (15 pages).

Virginia Smith, et al. "Federated Multi-Task Learning", 31st Conference on Neural Information Processing Systems, NIPS 2017 (11 pages).

Jakub Konečný "Federated Optimization: Distributed Machine Learning for On-Device Intelligence", arXiv:1610.02527v1 [cs.LG] Oct. 8, 2016 (38 pages).

* cited by examiner

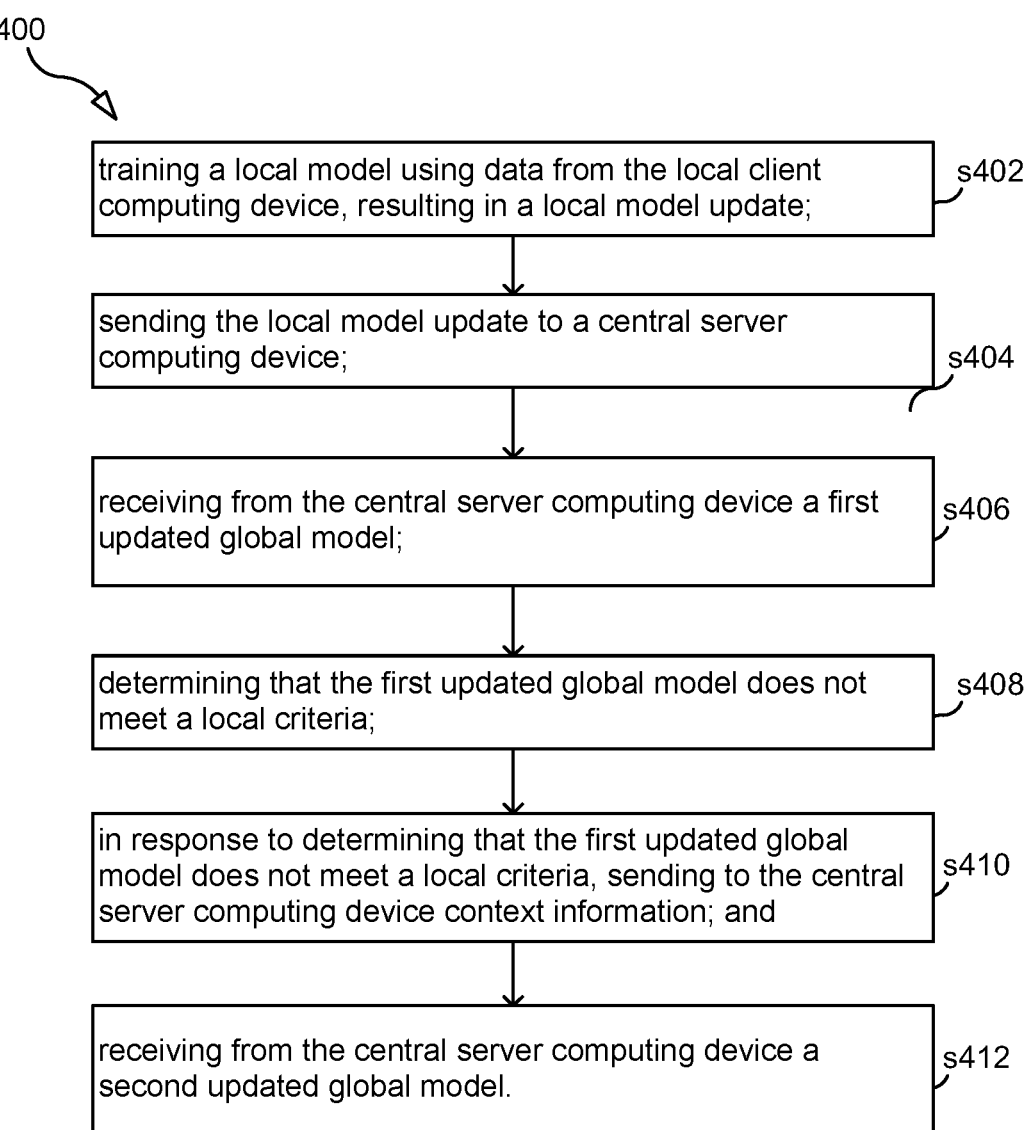

400 training a local model using data from the local client computing device, resulting in a local model update;    s402 sending the local model update to a central server computing device;    s404 receiving from the central server computing device a first updated global model;    s406 determining that the first updated global model does not meet a local criteria;    s408 in response to determining that the first updated global model does not meet a local criteria, sending to the central server computing device context information; and    s410 receiving from the central server computing device a second updated global model.    s412

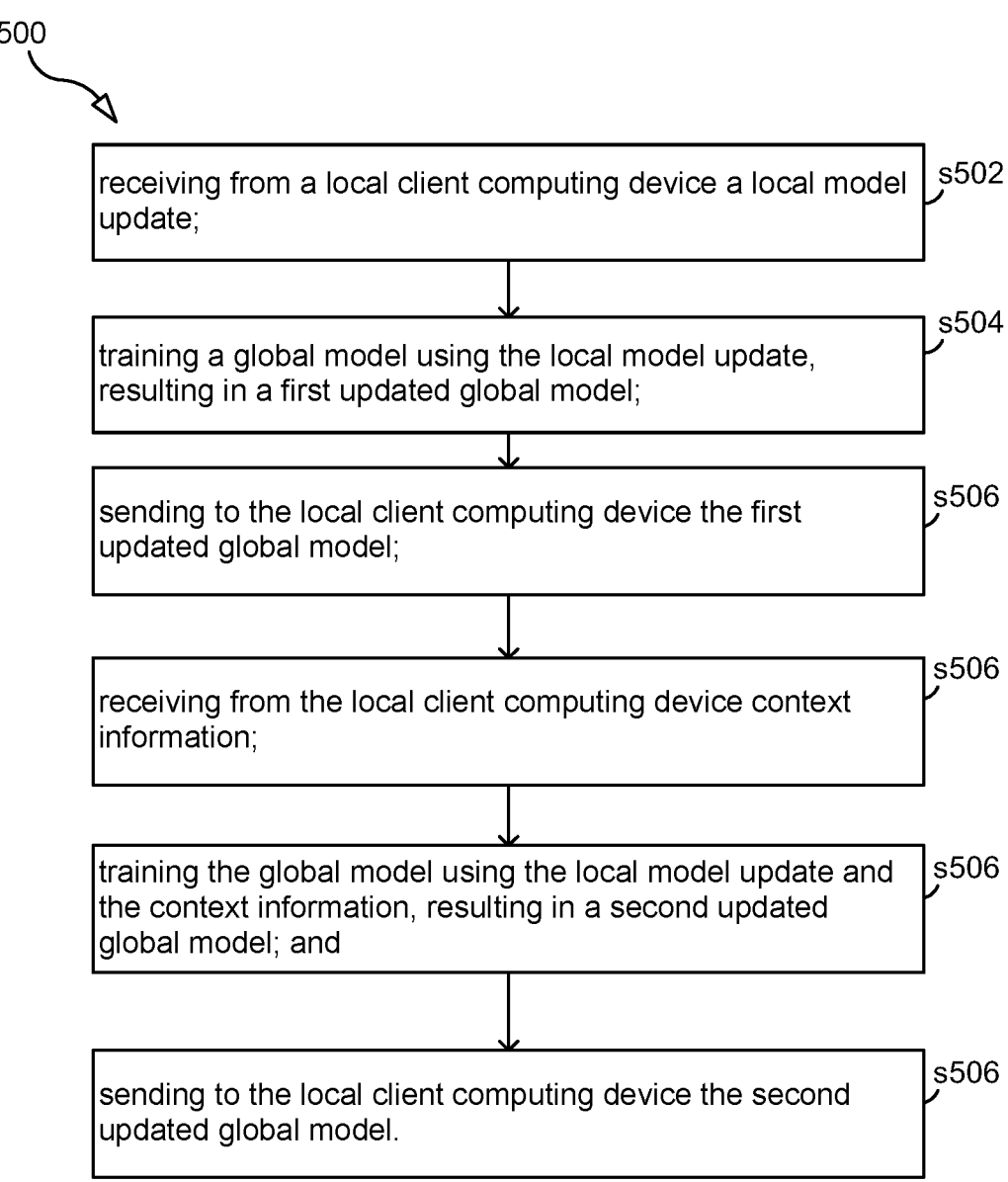

receiving from a local client computing device a local model update; s502 training a global model using the local model update, resulting in a first updated global model; s504 sending to the local client computing device the first updated global model; s506 receiving from the local client computing device context information; s506 training the global model using the local model update and the context information, resulting in a second updated global model; and s506 sending to the local client computing device the second updated global model. s506

FIG. 5

Apparatus
600

MODULE(S)
700

FIG. 7

CONTEXT-LEVEL FEDERATED LEARNING

CROSS REFERENCE TO RELATED APPLICATION(S)

This application is a 35 U.S.C. § 371 National Stage of International Patent Application No. PCT/IN2020/050047, filed Jan. 16, 2020.

TECHNICAL FIELD

Disclosed are embodiments related to context-level federated learning.

BACKGROUND

Machine learning techniques have become commonplace in business and other areas of the modern economy.

For example, globalization and digitalization have led to an explosion of manufacturers, dealers, suppliers, and distribution areas. These same forces also increase the need for unfaltering management e.g. of a complex network such as a global or regional supply chain. Accordingly, businesses are looking for ways to improve visibility into their operations, including across departments and beyond the boundaries of individual locations. Machine learning provides one such possibility, and can help to streamline certain business processes and models for amplifying business growth. Real-time monitoring of customer demand, critical business events, key-performance indicators (KPIs), and business transactions, for instance, can improve control and cost efficiency and also render a business more agile by enhancing its responsiveness to complex situations. Ultimately, this can improve customer experience, such as minimizing customer impact when local problems arise affecting supply distribution.

Just as accurate forecasting can improve a business's potential, inaccurate forecasting can plague businesses everywhere, especially ones in industries like healthcare, consumer goods, retail, automotive, logistics, etc. where such forecasting can help maintain a competitive edge. Instability in demand is driving businesses to adopt tools to gain real-time forecast ability, so that they are able to respond to highly volatile markets that have no tolerance for bottlenecks. Investing in real-time supply chain analytics can help businesses gain key inventory and forecasting metrics to combat the volatility of markets. Increasing operational costs inevitably affect budgets, working capital, cost of end-product, and cash flow. Systematic and timely analysis of critical data can help to achieve cost optimization in areas including material sourcing, load planning, fleet sizing, route and freight costing. Detailed analysis of finances, capability constraints, and potential supplier risk can minimize monetary loss in the later stages of supply chain management.

Machine learning makes it possible to discover patterns, such as in supply chain data, by relying on algorithmic methods that quickly pinpoint the most influential factors to a supply networks' success, while constantly learning in the process. Discovering new patterns in data, such as supply chain data, has the potential to improve many businesses. Machine learning algorithmic methods are finding these new patterns without the need for manual intervention or the definition of a taxonomy to guide the analysis. The algorithmic methods iteratively query data, with many using constraint-based modeling to find the core set of factors with the greatest predictive accuracy. Key factors influencing inventory levels, supplier quality, demand forecasting, procure-to-pay, order-to-cash, production planning, transportation management, and more, are becoming known for the first time. New knowledge and insights from machine learning are revolutionizing supply chain management to improve the business processes.

One of the most challenging aspects of managing a supply chain is predicting the future demands for production. Existing techniques range from baseline statistical analysis techniques including moving averages to advanced simulation modeling. Machine learning is proving to be very effective at considering factors where existing methods have no way of tracking or quantifying over time. Another aspect is that customer purchasing data will be observed from different locations and set to a central store to process and understand the demand indicated by the purchasing data, and also potentially making recommendation to streamline the business.

Other types of businesses also experience different issues that machine learning is helping to address. Another example is travel agencies attempting to arrange itineraries for customers is another. Still another example is businesses trying to route people to particular destinations.

Some issues, however, have arisen from this expanding use of machine learning. With the advancement of so-called "big data," which drives the machine learning, data privacy and security has become a worldwide concern. Leaks of public data can cause great concern to a company and those whose data has been leaked, resulting in negative press in the media and worsening relations with the public. For example, a recent data breach involving Facebook has caused a wide range of protests. At the same time, countries are strengthening the protection of data security and privacy. The General Data Protection Regulation (GDPR), which took effect in the European Union on May 25, 2018, aims to protect users' personal privacy and data security. It requires business to use clear and plain language for user agreements and grants users the "right to be forgotten," that is, users can have their personal data deleted or withdrawn upon request. The GDPR has nearly banned all kinds of autonomous activities in collecting, transferring, and using user data.

Given the changing legal landscape, and the different sensitivities to which the public and others asses their digital privacy and security, it is often no longer acceptable to simply collect sources of data and integrate them in one location without user permission. Also, many typical operations used to manage big data, such as merging user data from various source parties for building a machine-learning model without any user agreement, could now be considered illegal in the new regulatory framework or unsound from a customer relations perspective. The GDPR, for example, represents a fundamental shift in the protection of data and privacy, shaping how businesses operate. Companies may face serious monetary fines for the violation of the regulation.

In the field of machine learning, the traditional data processing model often involves one party collecting and transferring data to another party for processing, cleaning, and modeling, and finally selling the model to a third party. However, as the above regulations and monitoring become stricter and more substantial, it is possible to break the law by leaving the collector or the user unclear about the specific use of the model. This risks putting data in isolated islands. A straightforward solution is to collect all the data to one place for processing. However, it may now be illegal or commercially unwise to do so because the law and consumer sentiment may not allow businesses to arbitrarily consolidate data in this manner. Solving the issue of isolated data islands is a major challenge. One approach that has developed is federated learning which works, for example, by handling a user's data on the user's device and only sharing the extracted weights with a central store for business processing. The federative learning framework intends to make industries effectively and accurately use data across organizations while meeting the privacy, security, and other regulatory requirements, in addition to building more flexible and powerful models to enable business cooperation by using data collectively but without data exchange directly.

SUMMARY

In federated learning, the main idea is to build machine learning models based on data sets that are distributed across multiple devices while preventing data leakage. Federated learning therefore involves training a global model by incorporating updates from local models that are individually trained on local data across multiple devices. Recent improvements have focused on overcoming the statistical challenges in federated learning, or in making federated learning more personalizable. Such improvements focus on on-device federated learning, where distributed mobile user interactions are involved and communication costs (e.g., distribution of data among nodes, unbalanced data distribution, and device reliability) are some of the major factors for optimization.

There is room to improve current solutions of federated learning. As an example, consider that the accuracy of some users is reduced based on updating the global model. This reduction in accuracy may be due to additional features added from other users into the global model or something else. Current approaches do not effectively handle this situation. Embodiments proposed herein effectively handle the situation where some users have their accuracy decreased, e.g. by providing a feedback mechanism from the local models to the global model to express this loss in accuracy. Further, the global model may, in some embodiments, take into consideration this feedback and refit the model to increase the accuracy of (possibly all) the local models. Embodiments may increase the accuracy of (possibly all) local models by solving a double optimization problem (e.g., optimizing accuracy of global model and optimizing a score across local models), instead of a single optimization problem (e.g., just optimizing accuracy of global model) as in traditional federated learning. This double optimization problem can ensure that all the local models have a good gain in accuracy with respect to current federated learning approaches.

Embodiments resemble the reasoning performed by humans, e.g. a human buyer attempting try to bargain with a seller regarding their specifications until they reach a deal. In embodiments, the local models essentially try to bargain with the global model until a desired accuracy is reached. This can be extended to additional iterations, e.g. in order to achieve greater accuracy.

Advantages of embodiments include improving federated learning accuracy. Also, embodiments may optimize inventory management for supply chain logistics, such as by reducing wasteful stocking, increasing customer satisfaction due to best pricing which is also profitable for the suppliers, and increasing trust. Embodiments can also advantageously be used in areas such as human resources management, supply chain management, and so on.

According to a first aspect, a method performed by a local client computing device is provided. The method includes:

training a local model using data from the local client computing device, resulting in a local model update; sending the local model update to a central server computing device; receiving from the central server computing device a first updated global model; determining that the first updated global model does not meet a local criteria; in response to determining that the first updated global model does not meet a local criteria, sending to the central server computing device context information; and receiving from the central server computing device a second updated global model.

In some embodiments, determining that the first updated global model does not meet a local criteria comprises computing a score based on the first updated global model, where the score exceeds a threshold. In some embodiments, the computed score comprises an error information in a prediction. In some embodiments, the context information includes the computed score. In some embodiments, the context information is encoded prior to sending by using an auto-encoder. In some embodiments, the local model predicts items for stocking a store corresponding to the local client computing device to optimize supply chain management, and the context information comprises one or more of: an area of a market the store covers, a weight of the predicted items, a number of pre-orders for the predicted items, seasonal events related to the predicted items, and a price of the predicted items. In some embodiments, the local model predicts a travel itinerary for a user corresponding to the local client computing device to optimize travel plan selection.

According to a second aspect, a method performed by a central server computing device is provided. The method includes: receiving from a local client computing device a local model update; training a global model using the local model update, resulting in a first updated global model; sending to the local client computing device the first updated global model; receiving from the local client computing device context information; training the global model using the local model update and the context information, resulting in a second updated global model; and sending to the local client computing device the second updated global model.

In some embodiments, training the global model using the local model update and the context information, resulting in a second updated global model comprises using a modified objective function to incorporate the context information. In some embodiments, the context information includes an error information in a prediction from the local client computing device. In some embodiments, the received context information is encoded by using an auto-encoder. In some embodiments, the local model predicts items for stocking a store corresponding to the local client computing device to optimize supply chain management, and the context information comprises one or more of: an area of a market the store covers, a weight of the predicted items, a number of pre-orders for the predicted items, seasonal events related to the predicted items, and a price of the predicted items. In some embodiments, the local model predicts a travel itinerary for a user corresponding to the local client computing device to optimize travel plan selection.

According to a third aspect, a local client computing device is provided, including a memory; and a processor. The processor is configured to: train a local model using data from the local client computing device, resulting in a local model update; send the local model update to a central server computing device; receive from the central server computing device a first updated global model; determine that the first updated global model does not meet a local criteria; in response to determining that the first updated global model does not meet a local criteria, send to the central server computing device context information; and receiving from the central server computing device a second updated global model.

According to a fourth aspect, a central server computing device is provided, including a memory; and a processor. The processor is configured to: receive from a local client computing device a local model update; train a global model using the local model update, resulting in a first updated global model; send to the local client computing device the first updated global model; receive from the local client computing device context information; train the global model using the local model update and the context information, resulting in a second updated global model; and send to the local client computing device the second updated global model.

According to a fifth aspect, a computer program is provided comprising instructions which when executed by processing circuitry causes the processing circuitry to perform the method of any one of the embodiments of the first or second aspects.

According to a sixth aspect, a carrier is provided containing the computer program of the fifth aspect, wherein the carrier is one of an electronic signal, an optical signal, a radio signal, and a computer readable storage medium.

BRIEF DESCRIPTION OF THE DRAWINGS

The accompanying drawings, which are incorporated herein and form part of the specification, illustrate various embodiments.

FIG. 4 is a flow chart according to an embodiment.

FIG. 5 is a flow chart according to an embodiment.

FIG. 7 is a block diagram of an apparatus according to an embodiment.

DETAILED DESCRIPTION

Figure 1:
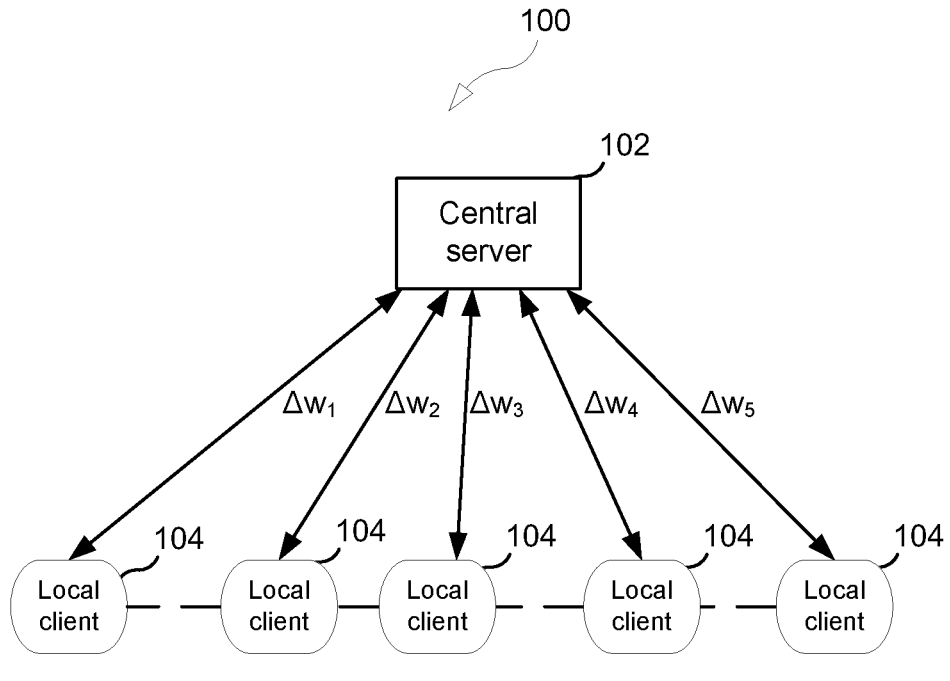
FIG. 1 illustrates a federated learning system according to an embodiment.

FIG. 1 illustrates a system 100 of machine learning according to an embodiment. As shown, a central server node or computing device 102 is in communication with one or more local client nodes or computing devices 104. Optionally, local client nodes or computing devices 104 may be in communication with each other utilizing any of a variety of network topologies and/or network communication systems. For example, local client nodes 104 include user computing devices such as a smart phone, tablet, laptop, personal computer, and so on, and may also be communicatively coupled through a common network such as the Internet (e.g., via WiFi) or a communications network (e.g., LTE or 5G). Central server nodes 104 may include computing devices such as servers, base stations, mainframes, and cloud computing resources. While a central server node or computing device 102 is shown, the functionality of central server computing device 102 may be distributed across multiple computing devices, and may be shared between one or more of local client computing devices 104.

As shown, each local client computing device 104 may communicate model updates to central server computing device 102, and central server computing device 102 may send the updated global model to the local client computing devices 104. The link between central server computing device 102 and local client computing devices 104 is shown as being bidirectional between those entities (e.g. with a two-way link, or through a different communication channel).

Federated learning as described in embodiments herein may involve one or more rounds, where a global model is iteratively trained in each round. Local client computing devices 104 may register with the central server computing device 102 to indicate their willingness to participate in the federated learning of the global model, and may do so continuously or on a rolling basis. Upon registration (and potentially at any time thereafter), the central server computing device 102 transmit training parameters to local client computing devices 104. The central server computing device 102 may transmit an initial model to the local client computing devices 104. For example, the central server computing device 102 may transmit to the local client computing devices 104 a global model (e.g., newly initialized or partially trained through previous rounds of federated learning). The local client computing devices 104 may train their individual models locally with their own data. The results of such local training may then be reported back to central server computing device 102, which may pool the results and update the global model. This process may be repeated iteratively. Further, at each round of training the global model, central server computing device 102 may select a subset of all registered local client computing devices 104 (e.g., a random subset) to participate in the training round.

Typically in federated learning, the global model is obtained by aggregating weights from the local models (e.g. by using the mean of the local models). This works well when all the local models are substantially similar and fit to substantially the same use case. However, when some local models are not substantially similar or do not fit to substantially the same use case, the performance of those local models may suffer.

As an example, consider a scenario where there are two supermarkets in a local area. For the sake of the example, assume that the local models predicted 50 kg of pulses for both supermarkets for next month. In addition, assume that the cost of pulses is greater in one supermarket than the other. In this case, in order to maximize profits, it is important for the global model to provision more pulses to the supermarket where the cost is higher. However, this is not always the right choice, as other variables such as the customer satisfaction may be affected. For example, customer satisfaction may decrease in the supermarket where the pulses are cheaper if there is not a sufficient supply to meet the demand. Accordingly, embodiments described herein may be appropriate to solve such a use case. By bringing in additional context (e.g., the price of the pulses at each supermarket, the profit realization at each supermarket, and/or customer satisfaction at each supermarket), the global model is able to make improved decisions.

Local client computing devices 104 may send context to the central server computing device 102, such as shown in FIG. 1. As shown in FIG. 1, each model may send weights $\Delta w_i$ as context. Alternatively, or in addition, other information may be used as context to send to the central server computing device 104.

In order to explain a particular application of some embodiments, the disclosure here considers scheduler models. For example, continuing the supermarket example, local client computing devices 104 may build their own scheduler models for items they have and send the demand for those items to central server computing device 102. Similarly, in some embodiments, the local client computing devices 104 may send only the partial demand for the items they planned to procure. In this way, several local client computing devices 104 may send their updates to the central server computing device 102. In addition, the local client computing devices 104 (e.g., the super market, or employees of the super market managing the supply chain process) may also send price information for each item along with the local models. The central server computing device 102 may then take all the outputs of the local models and try to solve an additional optimization, such as optimizing the profit of the company owning the supermarkets. The central server computing device 102 may then send the global model updates to the local client computing devices 104. These local client computing devices 104 may employ the global model and compute the error in the predictions. In some cases, where this error is large, the local client computing devices 104 may engage in a feedback mechanism to improve the global model, e.g. by supplying additional context such as the amount of error back to the central server computing device 102.

In some embodiments, context may include weights or other information. For example, features such as geographical area that the supermarket covers, weight of the items (e.g., in pounds), number of pre-orders associated with the items, seasonal events, and so on, may be used to obtain the context. In some embodiments, context is provided to the central server computing device 102 after being encoded by an auto encoder (see auto encoder 208 in FIG. 2). The central server computing device 102 may process this information (context) and assign weights for the global model based on the additional information (e.g., output of auto encoder 208). Embodiments use auto encoders, for example, to compress information before sending, thereby reducing computational power and bandwidth resources.

Figure 2:
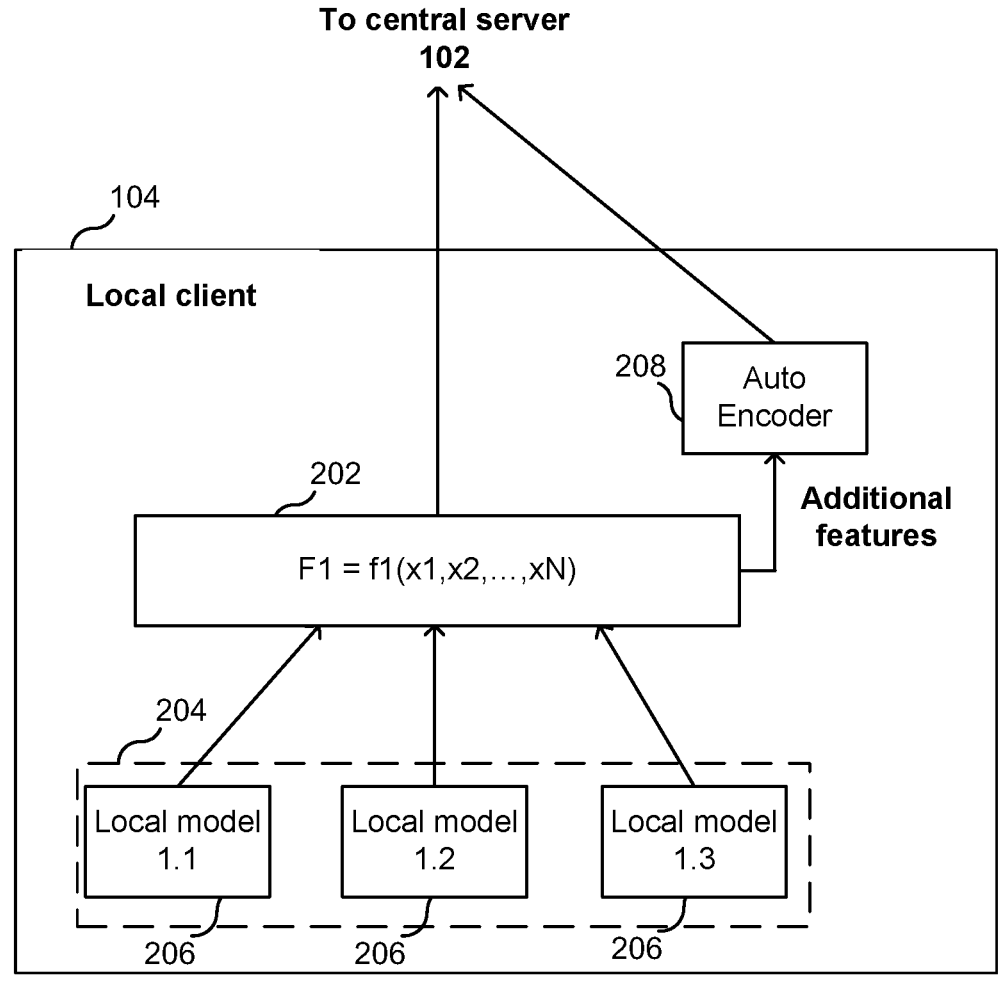
FIG. 2 illustrates a local client node according to an embodiment.

FIG. 2 illustrates a local client computing device 104 according to an embodiment. As shown, local client computing device 104 manages a local model 202, e.g. shown as function F1=f1(x1, x2, . . . xN). In some embodiments, there may be a single "layer" of models, that is one layer of local models underneath the global model. In some embodiments, there may be multiple "layers" of models. For example, local model 202 may take as input the outputs of one or more sub-models 206 from an optional sub-model layer 204. In addition to providing output to the central server computing device 102, local model 202 may also provide additional information (context) to central server computing device 102, e.g. after encoding such information with auto encoder 208.

While a specific example regarding super market supply chains has been considered, it is noted that this example has been considered for exemplary purposes only. Embodiments provided herein are applicable across different problem domains, and generally to improving federated learning by considering additional local model context.

As another example, consider an embodiment involving a travel agency. Several travel booking applications (apps) exist in the market that help users in selecting the best travel options like flight or other transportation options, hotel stay, sightseeing deals, and so on. Some of these apps provide different costs for the same itinerary to different users, depending on a number of different criteria. By gathering user needs and providing an optimal plan selection from the global models, embodiments can facilitate retaining customer satisfaction as well as maintaining the profits for the vendors. Embodiments can also analyze user behavior and provide optimal recommendations without affecting users' privacy. In this case, the context may for example include sending the cost of the travel from the user side in order to obtain the cheapest mode of travel.

As another example, consider an embodiment involving communication networks. Different operators may have different characteristics of communication data that can be used to predict alarms (e.g., at different network nodes in the communication network) and user behavior. However, communication operators may not want to share their own data because of security or privacy concerns, among other potential concerns. Hence, federated learning such as disclosed in embodiments herein can be helpful to assist operators as it involves sharing of models rather than underlying sensitive data used to train those models. In the current example, the context may for example include sending the prediction error of each operator in order to improve the global model output.

Figure 3:
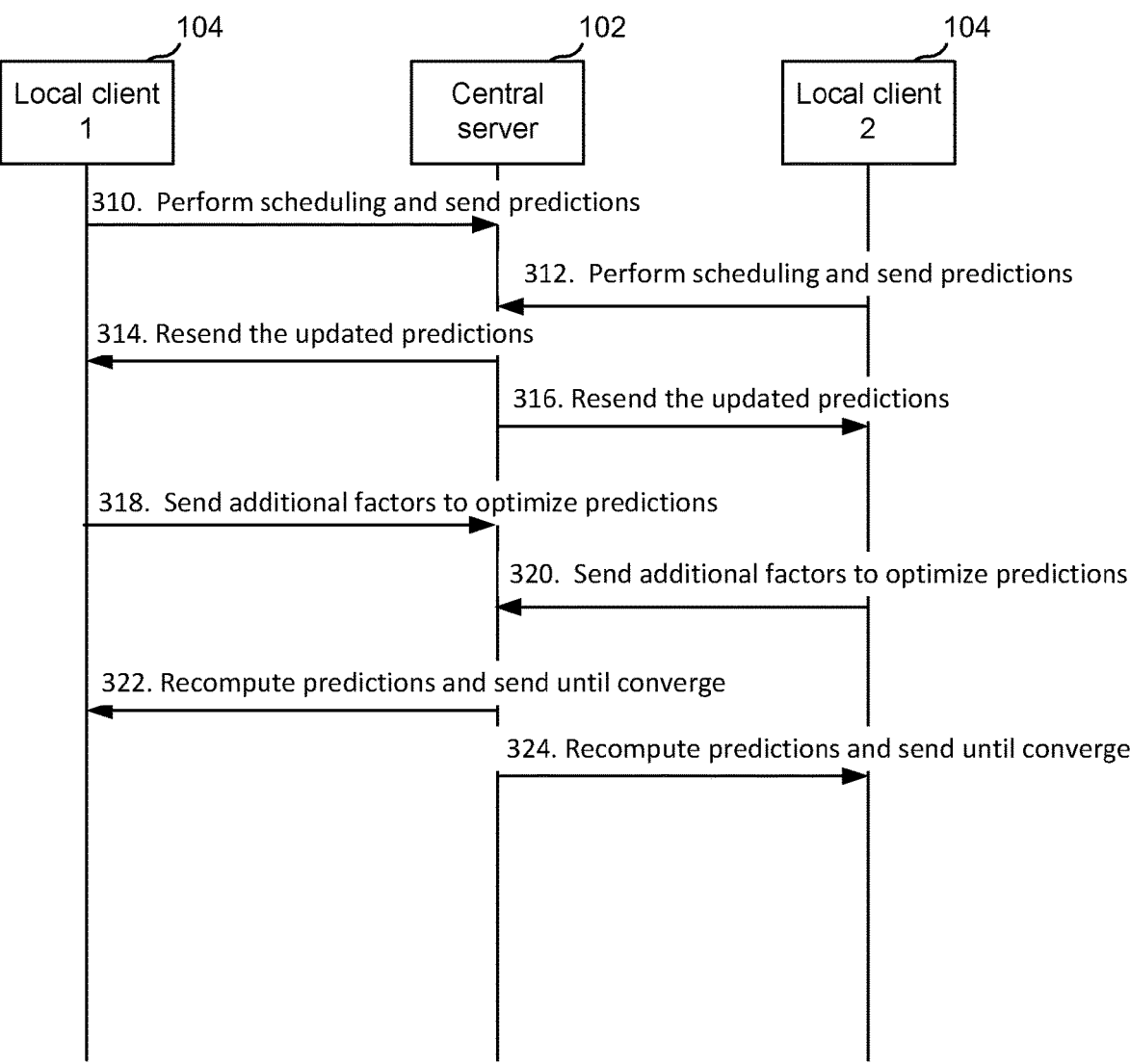
FIG. 3 illustrates a message diagram according to an embodiment.

FIG. 3 illustrates a message flow diagram according to an embodiment. As shown, two local client computing devices 104 are communicating with a central server computing device 102; however, this is for illustration purposes only, and more or fewer local client computing devices 104 may communicate with central server computing device 102.

Embodiments include one or more of the following steps:

1. Each local client computing device 104 constructs a local model (e.g., local model 202). In some embodiments, such local models perform a scheduling problem on items to be procured (see 310, 312: "Perform scheduling and send predictions"). For example, sub-models 206 may be provided for each item, and local model 202 outputs the procurement schedule for all items.

2. Each local client computing device 104 sends its local model to the central server computing device 102 (see 310, 312: "Perform scheduling and send predictions"). The local client computing devices 104 may also include additional information (context). In some embodiments, this context may include the price of each item to be procured. The central server computing device 102 may use the local models and context it has received to obtain an updated global model.

3. The central server computing device 102 sends the updated global model to the local client computing devices 104 (see 314, 316: "Resend the updated predictions"). Each local client computing device 104 computes a score based on the global model. For example, each local client computing device 104 may determine an error of its local model.

4. Each local client computing device 104 sends the computed score (e.g., the error) as context to the central server computing device 102 (see 318, 320: "Send additional factors to optimize predictions"). Sending this context information may include encoding the information using an auto encoder.

5. Upon receiving the computed score (e.g., the error), the central server computing device 102 may adjust the global model, for example by modifying the objective function to include the computed score (or other context information) as inputs. The central server computing device 102 then uses the modified objective function to re-compute the global model (see 322, 324:

"322. Recompute predictions and send until converge"). For example, the central server computing device 102 may, in some embodiments, re-perform the scheduling problem.

6. Based on the error transmitted from global model, this process may repeat iteratively until convergence, or some other stopping factor is reached (see 322, 324: "Recompute predictions and send until converge")).

FIG. 4 illustrates a flow chart according to an embodiment. Process 400 is a method performed by a local client computing device 104. Process 400 may begin with step s402.

Step s402 comprises training a local model using data from the local client computing device, resulting in a local model update.

Step s404 comprises sending the local model update to a central server computing device.

Step s406 comprises receiving from the central server computing device a first updated global model.

Step s408 comprises determining that the first updated global model does not meet a local criteria.

Step s410 comprises, in response to determining that the first updated global model does not meet a local criteria, sending to the central server computing device context information.

Step s412 comprises receiving from the central server computing device a second updated global model.

In some embodiments, determining that the first updated global model does not meet a local criteria comprises computing a score based on the first updated global model, wherein the score exceeds a threshold. For example, a score based on the first updated global model may comprise an expected profit realization or expected revenue, and the threshold may comprise a minimum expected profit realization or expected revenue.

In some embodiments, the computed score comprises an error information in a prediction. In some embodiments, the context information includes the computed score. In some embodiments, the context information is encoded prior to sending by using an auto-encoder. In some embodiments, the local model predicts items for stocking a store corresponding to the local client computing device to optimize supply chain management, and the context information comprises one or more of: an area of a market the store covers, a weight of the predicted items, a number of pre-orders for the predicted items, seasonal events related to the predicted items, and a price of the predicted items. In some embodiments, the local model predicts a travel itinerary for a user corresponding to the local client computing device to optimize travel plan selection.

FIG. 5 illustrates a flow chart according to an embodiment. Process 500 is a method performed by a central server computing device 102. Process 500 may begin with step s502.

Step s502 comprises receiving from a local client computing device a local model update.

Step s504 comprises training a global model using the local model update, resulting in a first updated global model.

Step s506 comprises sending to the local client computing device the first updated global model.

Step s508 comprises receiving from the local client computing device context information.

Step s510 comprises training the global model using the local model update and the context information, resulting in a second updated global model.

Step s512 comprises sending to the local client computing device the second updated global model.

In some embodiments, training the global model using the local model update and the context information, resulting in a second updated global model comprises using a modified objective function to incorporate the context information (for example by modifying the objective function to include the computed score (or other context information) as inputs). In some embodiments, the context information includes error information from the local client computing device. In some embodiments, the received context information is encoded by using an auto-encoder. In some embodiments, the local model predicts items for stocking a store corresponding to the local client computing device to optimize supply chain management, and the context information comprises one or more of: an area of a market the store covers, a weight of the predicted items, a number of pre-orders for the predicted items, seasonal events related to the predicted items, and a price of the predicted items. In some embodiments, the local model predicts a travel itinerary for a user corresponding to the local client computing device to optimize travel plan selection.

Figure 6:
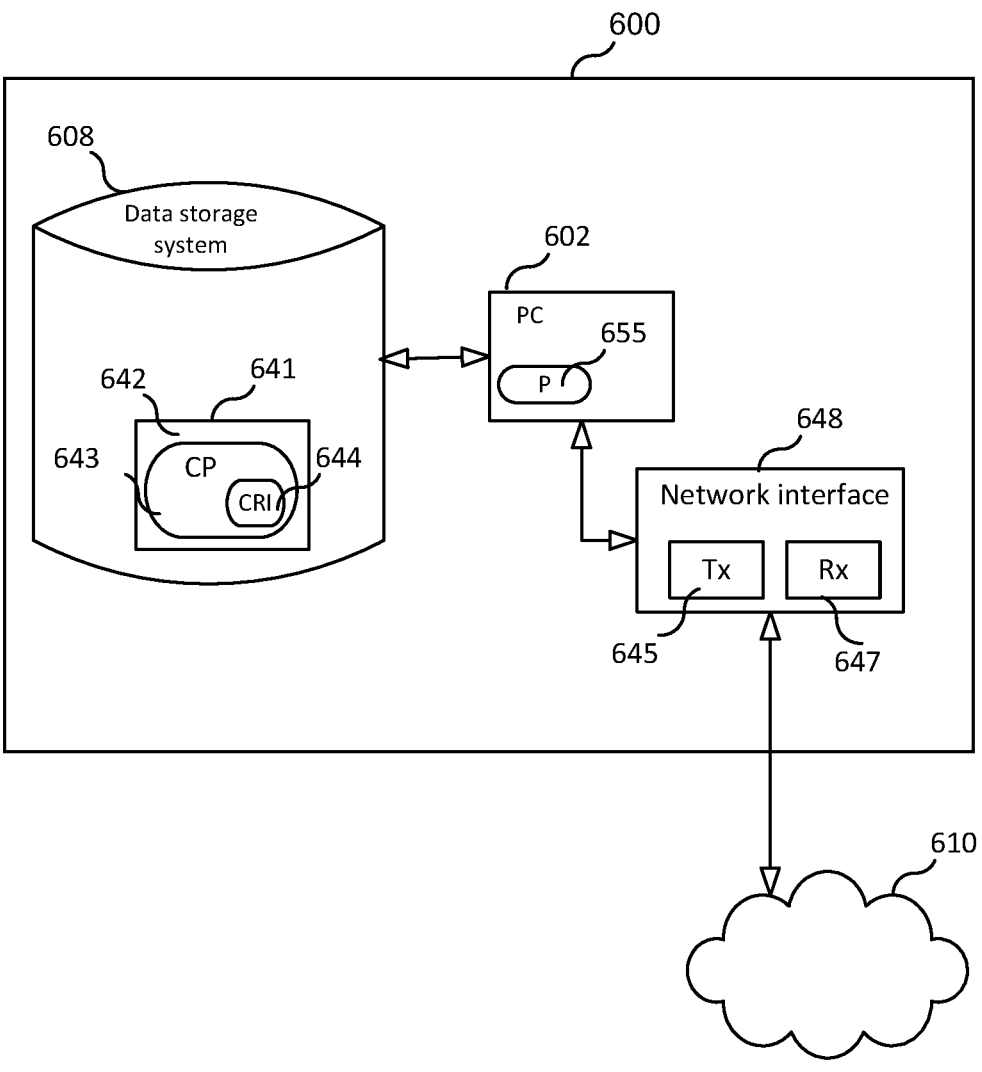
FIG. 6 is a block diagram of an apparatus according to an embodiment.

FIG. 6 is a block diagram of an apparatus 600 (e.g., a local client computing device 104 and/or central server computing device 102), according to some embodiments. As shown in FIG. 6, the apparatus may comprise: processing circuitry (PC) 602, which may include one or more processors (P) 655 (e.g., a general purpose microprocessor and/or one or more other processors, such as an application specific integrated circuit (ASIC), field-programmable gate arrays (FP-GAs), and the like); a network interface 648 comprising a transmitter (Tx) 645 and a receiver (Rx) 647 for enabling the apparatus to transmit data to and receive data from other nodes connected to a network 610 (e.g., an Internet Protocol (IP) network) to which network interface 648 is connected; and a local storage unit (a.k.a., "data storage system") 608, which may include one or more non-volatile storage devices and/or one or more volatile storage devices. In embodiments where PC 602 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, magnetic media (e.g., a hard disk), optical media, memory devices (e.g., random access memory, flash memory), and the like. In some embodiments, the CRI 644 of computer program 643 is configured such that when executed by PC 602, the CRI causes the apparatus to perform steps described herein (e.g., steps described herein with reference to the flow charts). In other embodiments, the apparatus may be configured to perform steps described herein without the need for code. That is, for example, PC 602 may consist merely of one or more ASICs. Hence, the features of the embodiments described herein may be implemented in hardware and/or software.

Figure 7:
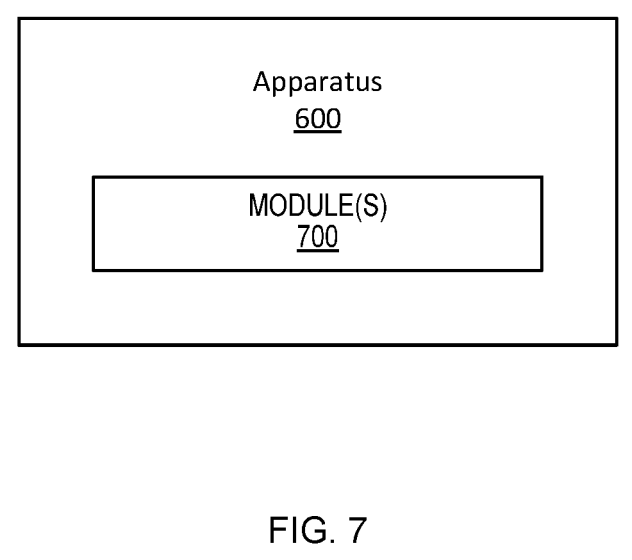

FIG. 7 is a schematic block diagram of the apparatus 600 according to some other embodiments. The apparatus 600 includes one or more modules 700, each of which is implemented in software. The module(s) 700 provide the functionality of apparatus 600 described herein (e.g., the steps herein, e.g., with respect to FIGS. 3-5).

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a local client computing device, the method comprising:

training a local model using data from the local client computing device, resulting in a local model update;

sending the local model update to a central server computing device;

receiving from the central server computing device a first updated global model;

determining that the first updated global model does not meet a local criteria;

in response to determining that the first updated global model does not meet a local criteria, sending to the central server computing device context information; and receiving from the central server computing device a second updated global model.

2. The method of claim 1, wherein determining that the first updated global model does not meet a local criteria comprises computing a score based on the first updated global model, wherein the score exceeds a threshold.

3. The method of claim 1, wherein the computed score comprises an error information in a prediction and wherein the context information includes the computed score and is encoded prior to sending by using an auto-encoder.

4. The method of claim 1, wherein the local model predicts items for stocking a store corresponding to the local client computing device to optimize supply chain management, and the context information comprises one or more of: an area of a market the store covers, a weight of the predicted items, a number of pre-orders for the predicted items, seasonal events related to the predicted items, and a price of the predicted items.

5. The method of claim 1, wherein the local model predicts a travel itinerary for a user corresponding to the local client computing device to optimize travel plan selection.

6. A method performed by a central server computing device, the method comprising:

receiving from a local client computing device a local model update;

training a global model using the local model update, resulting in a first updated global model;

sending to the local client computing device the first updated global model;

receiving from the local client computing device a context information;

training the global model using the local model update and the context information, resulting in a second updated global model; and sending to the local client computing device the second updated global model.

7. The method of claim 6, wherein training the global model using the local model update and the context information, resulting in a second updated global model comprises using a modified objective function to incorporate the context information.

8. The method of claim 6, wherein the context information includes an error information in a prediction from the local client computing device and the received context information is encoded by using an auto-encoder.

9. The method of claim 6, wherein the local model predicts items for stocking a store corresponding to the local client computing device to optimize supply chain management, and the context information comprises one or more of: an area of a market the store covers, a weight of the predicted items, a number of pre-orders for the predicted items, seasonal events related to the predicted items, and a price of the predicted items.

10. The method of claim 6, wherein the local model predicts a travel itinerary for a user corresponding to the local client computing device to optimize travel plan selection.

11. A local client computing device comprising:

a memory; and a processor, wherein said processor is configured to:

train a local model using data from the local client computing device, resulting in a local model update;

send the local model update to a central server computing device;

receive from the central server computing device a first updated global model;

determine that the first updated global model does not meet a local criteria;

in response to determining that the first updated global model does not meet a local criteria, send to the central server computing device context information; and receiving from the central server computing device a second updated global model.

12. The local client computing device of claim 11, wherein determining that the first updated global model does not meet a local criteria comprises computing a score based on the first updated global model, wherein the score exceeds a threshold.

13. The local client computing device of claim 11, wherein the computed score comprises an error in a prediction and wherein the context information includes the computed score and is encoded prior to sending by using an auto-encoder.

14. The local client computing device of claim 11, wherein the local model predicts items for stocking a store corresponding to the local client computing device to optimize supply chain management, and the context information comprises one or more of: an area of a market the store covers, a weight of the predicted items, a number of pre-orders for the predicted items, seasonal events related to the predicted items, and a price of the predicted items.

15. The local client computing device of claim 11, wherein the local model predicts a travel itinerary for a user corresponding to the local client computing device to optimize travel plan selection.

16. A central server computing device comprising:

a memory; and a processor, wherein said processor is configured to:

receive from a local client computing device a local model update;

train a global model using the local model update, resulting in a first updated global model;

send to the local client computing device the first updated global model;

receive from the local client computing device context information;

train the global model using the local model update and the context information, resulting in a second updated global model; and send to the local client computing device the second
updated global model.

17. The central server computing device of claim 16,
wherein training the global model using the local model
update and the context information, resulting in a second
updated global model comprises using a modified objective
function to incorporate the context information.

18. The central server computing device of claim 16,
wherein the context information includes error information
from the local client computing device and the received
context information is encoded by using an auto-encoder.

19. The central server computing device of claim 16,
wherein the local model predicts items for stocking a store
corresponding to the local client computing device to opti-
mize supply chain management, and the context information
comprises one or more of: an area of a market the store
covers, a weight of the predicted items, a number of pre-
orders for the predicted items, seasonal events related to the
predicted items, and a price of the predicted items.

20. The central server computing device of claim 16,
wherein the local model predicts a travel itinerary for a user
corresponding to the local client computing device to opti-
mize travel plan selection.

* * * * *